(No Model.)

J. H. BROWN.
INSERTIBLE SAW TOOTH.

No. 301,431. Patented July 1, 1884.

WITNESSES:
Chas. Nidd
C. Sedgwick

INVENTOR:
J. H. Brown
BY Munn & Co
ATTORNEYS.

UNITED STATES PATENT OFFICE.

JOHN H. BROWN, OF SOUTH TRENTON, NEW YORK.

INSERTIBLE SAW-TOOTH.

SPECIFICATION forming part of Letters Patent No. 301,431, dated July 1, 1884.

Application filed May 17, 1884. (No model.)

*To all whom it may concern:*

Be it known that I, JOHN H. BROWN, of South Trenton, in the county of Oneida and State of New York, have invented a new and useful Improvement in Insertible Teeth for Crosscut and Circular Saws, of which the following is a full, clear, and exact description.

Reference is to be had to the accompanying drawings, forming a part of this specification, in which similar letters of reference indicate corresponding parts in all the figures.

Figure 1:
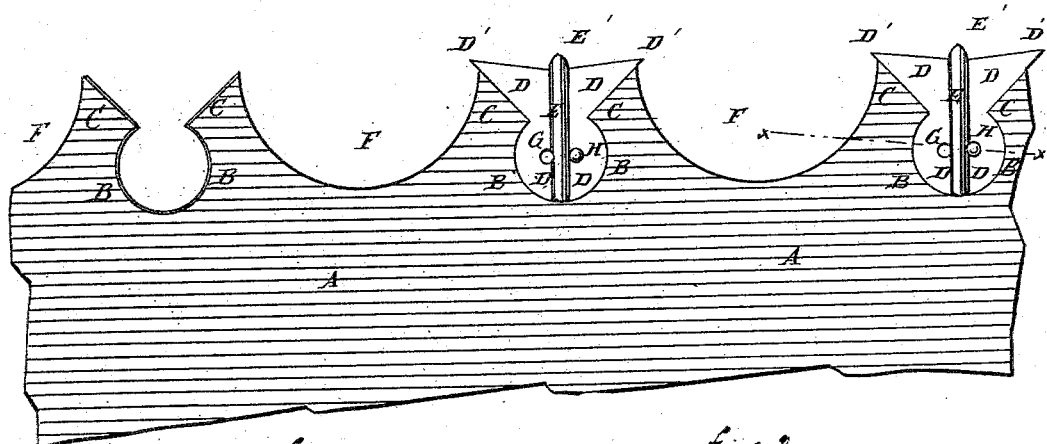
Figure 3:
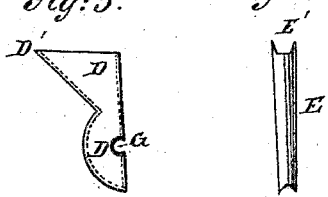
Figure 4:
Figure 2:
Figure 5:
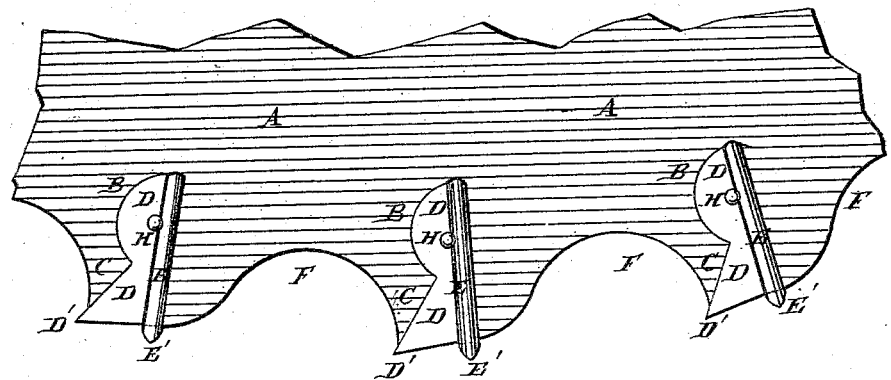

Figure 1 is a side elevation of a portion of a crosscut-saw to which my improvement has been applied. Fig. 2 is an edge view of a part of the same, partly in section through the line $x\ x$, Fig. 1. Fig. 3 is a side elevation of one of the teeth. Fig. 4 is a front elevation of one of the tracer-spurs. Fig. 5 is a side elevation of a portion of a circular saw to which my improvement has been applied.

The object of this invention is to provide crosscut and circular saws capable of doing the greatest amount of work with the least effort and the least expense, and which shall be so constructed as to require neither filing nor setting.

The invention consists in an insertible sawtooth made with its forward edge curved in its inner part and inclined forward in its outer part, with its rear edge straight, and with its outer edge inclined outward from the straight rear edge to its point, to adapt it to be inserted in a correspondingly-shaped seat in a sawplate.

The invention also consists in a saw-plate made with tooth-seats having their inner parts curved and their outer parts inclined forward, to adapt them to receive correspondingly-shaped saw-teeth, and having recesses between the adjacent tooth-seats to receive the shavings.

The invention further consists in the combination, with the saw-plate and one or more teeth, of a round tracer-spur made thicker than the said plate and teeth, tapered inward upon its outer sides, and having a pair of points upon its outer end, whereby parallel lines will be traced in the bottom of the kerf to form the sides of the said kerf, as will be hereinafter fully described.

A represents a saw-plate, in the edge of which are formed seats for the teeth. The inner parts, B, of the seats for the teeth are made circular, and the outer parts, C, are made flaring, forming inclined shoulders. D are the teeth, two of which are placed in each seat B C, and which are so formed as to fit against the curved and inclined walls of the said seats. The curved and inclined edges of the teeth D are grooved to fit upon the correspondingly-shaped edge of the saw-plate, to hold the said teeth from lateral movement. The other or rear edges of the teeth D are straight, and at right angles with the length of the saw. The teeth D are made of such a size as to leave a narrow space between the straight edges of the teeth of each pair to receive the tracerspur E. The tracer-spurs E are made of hardened steel wire, a gage or two thicker than the saw-plate A and teeth D, and are slightly tapered upon the outer sides from their outer ends inward, to prevent binding. The tracerspurs E fit into grooves in the straight edges of the teeth D, are made a little longer than the teeth D, and are notched in their outer ends in line with the saw-plate, to form points or spurs E', which trace parallel lines in the bottom of the kerf, and thus form a kerf a little wider than the thickness of the saw-plate A, so that the teeth will not require setting. The outer ends of the teeth D incline outward from their inner straight edges to their outer inclined edges to form points D', the inclination of the said ends being such that the points of the teeth D will operate upon the wood in the same manner and at about the same angle as the iron of an ordinary hand-plane, so as to cut shavings from the bottom of the kerf between the lines traced by the points of the tracer-spurs E.

In the edge of the saw-plate A, between the teeth-seats B C, are formed semicircular recesses F, to receive the shavings from the teeth D and carry them out of the kerf. With this construction the teeth will not require to be either set or filed, and when dulled, worn, or broken can be readily removed and replaced with new ones at a trifling expense, so that the sawyer can always have his saw in good working order at a less expense than when he uses a saw requiring to be frequently filed and set. The teeth D are all made of exactly the same size and shape, so that each tooth can be changed from one side of the seat B C to the other, or from one seat to another. In the inner part of each tooth, at its straight edge, is formed a hole, G, to receive a rivet, H, to press against the tracer-spur E and lock the said spur in place. Only one rivet H need be used for each pair of teeth. In the case of circular saws only one tooth D is used with each spur E, as illustrated in Fig. 5.

Having thus described my invention, I claim as new and desire to secure by Letters Patent—

1. An insertible saw-tooth made substantially as herein shown and described, with its forward edge curved in its inner part and inclined forward in its outer part, its rear edge straight, and its outer edge inclined outward from the straight rear edge to the point, to adapt it to be inserted in a correspondingly-shaped seat in a saw-plate, as set forth.

2. A saw-plate made substantially as herein shown and described, with tooth-seats having their inner parts, B, curved and their outer parts, C, inclined forward, to adapt them to receive correspondingly-shaped saw-teeth, and having recesses F between the adjacent tooth-seats, to receive the shavings, as set forth.

3. The combination, with the saw-plate A and one or more teeth, D, of the round tracer-spur E, made thicker than the said plate and teeth, tapered inward upon its outer sides, and having a pair of points, E', upon its outer end, substantially as herein shown and described, whereby parallel lines will be traced in the bottom of the kerf to form the sides of the said kerf, as set forth.

JOHN H. BROWN.

Witnesses:
GEORGE W. JONES,
GEORGE A. VEER.